(12) United States Patent
Kim et al.

(10) Patent No.: US 8,008,397 B2
(45) Date of Patent: Aug. 30, 2011

(54) IMPACT STRENGTH MODIFIERS FOR POLYVINYL CHLORIDE RESIN AND METHOD OF PREPARING THEM

(75) Inventors: Yoon Ho Kim, Busan (KR); Wonsuk Jang, Seoul (KR); Geon Soo Kim, Yeosu (KR)

(73) Assignee: LG Chem, Ltd. (KR)

( * ) Notice: Subject to any disclaimer, the term of this patent is extended or adjusted under 35 U.S.C. 154(b) by 341 days.

(21) Appl. No.: 11/500,611

(22) Filed: Aug. 8, 2006

(65) Prior Publication Data

US 2007/0043167 A1    Feb. 22, 2007

(30) Foreign Application Priority Data

Aug. 19, 2005 (KR) .................. 10-2005-0076467
Jan. 3, 2006 (KR) .................. 10-2006-0000497

(51) Int. Cl.
*C08L 27/06* (2006.01)
*C08L 33/12* (2006.01)
*C08L 51/04* (2006.01)

(52) U.S. Cl. ............ 525/80; 525/78; 525/81; 525/82; 525/84; 525/191; 525/242; 525/243; 525/305; 525/902

(58) Field of Classification Search ........... 525/67, 525/69, 80, 83, 84, 85, 191, 242, 243, 313, 525/316, 902, 315, 298, 302, 310
See application file for complete search history.

(56) References Cited

U.S. PATENT DOCUMENTS

| | | | |
|---|---|---|---|
| 4,352,910 A | 10/1982 | Katto et al. | |
| 4,431,772 A * | 2/1984 | Katto et al. | ............ 525/80 |
| 4,508,876 A | 4/1985 | Takaki et al. | |
| 5,583,173 A | 12/1996 | Gujarathi et al. | |
| 6,331,580 B1 | 12/2001 | Molnar | |
| 6,348,542 B1 | 2/2002 | Naruse et al. | |

FOREIGN PATENT DOCUMENTS

| | | |
|---|---|---|
| EP | 0 278 788 | 8/1988 |
| JP | 1982-073036 A | 5/1982 |
| JP | 1982-212246 A | 12/1982 |
| JP | 58-152039 | 9/1983 |
| JP | 02-283745 | 11/1990 |
| JP | 03-259942 | 11/1991 |
| JP | 2002127326 | 5/2002 |
| KR | 100178455 | 11/1998 |
| KR | 20030071266 A | 9/2003 |
| KR | 1020040049066 A | 6/2004 |
| KR | 1020040059027 A | 7/2004 |
| KR | 1020050038453 | 4/2005 |
| WO | WO99/03925 | 1/1999 |
| WO | WO 2005040225 A1 * | 5/2005 |
| WO | 2006038768 | 4/2006 |

OTHER PUBLICATIONS

Brandup, J. et al, Polymer Handbook 4th Edition John Wiley and Sons, Inc. New York et al 1999 pp. 571-577.*
PCT International Search Report for International Application No.: PCT/KR2006/003104; Date of Mailing: Nov. 16, 2006.
Notification of the First Office Action (with English Translation).
European Search Report; Reference: FB18998; Application No.:/Patent No. 06783539.7-1214/1866352 PCT/KR2006003104 ; Dated: Feb. 19, 2009.

* cited by examiner

*Primary Examiner* — Irina S Zemel
*Assistant Examiner* — Jeffrey Lenihan
(74) *Attorney, Agent, or Firm* — Cantor Colburn LLP

(57) ABSTRACT

Provided are a rubber latex having a multi-layer structure, wherein an inner-layer rubber latex has a refractive index greater than that of an outer-layer rubber latex, a graft copolymer prepared from the rubber latex, a polyvinyl chloride (PVC) resin blend containing the graft copolymer, and a method of preparing the rubber latex. The PVC resin blend containing the graft copolymer including the rubber latex according to the present invention has improved color property and low-temperature impact strength than conventional PVC resins.

12 Claims, No Drawings

IMPACT STRENGTH MODIFIERS FOR POLYVINYL CHLORIDE RESIN AND METHOD OF PREPARING THEM

This application claims priority to Korean Patent Application Nos. 10-2005-0076467, filed on Aug. 19, 2005, and 10-2006-0000497, filed on Jan. 3, 2006 in the Korean Intellectual Property Office, and all the benefits accruing therefrom under 35 U.S.C. §119, and the contents of which in its entirety are herein incorporated by reference.

BACKGROUND OF THE INVENTION

1. Field of the Invention

The present invention relates to an impact strength modifier for polyvinyl chloride (PVC) and a method of preparing the impact strength modifier, and more particularly, to a graft copolymer of alkyl (meth)acrylate-a conjugated diene monomer-an ethylenically unsaturated aromatic compound (hereinafter, referred to as "MBS based graft copolymer"), useful as an impact strength modifier for PVC resin, and a method of preparing the graft copolymer.

2. Description of the Related Art

PVC resin comprises at least 50% of vinyl chloride. Since PVC resin is very weak to impact, research has been conducted on methods to overcome this problem. Methods of increasing impact resistance of PVC resin include using a graft polymer as impact strength modifier for PVC resin, which is prepared by grafting monomers, such as styrene, methyl methacrylate, or acrylonitrile on rubber latex based on butadiene. However, although this method provides an effect of modifying impact strength of the PVC resin, the resulting products have low transparency and whitening occurs during formation of sheets of the PVC resins.

It is known that physical properties of MBS based graft copolymers depend on amounts of the respective monomers to be grafted, polymerization method, and an amount and particle diameters of rubber latex used as a substrate, etc. In order to increase impact strength, the amount and the particle diameters of the rubber latex used as a substrate are generally increased. However, when such a rubber latex is included in PVC resin, since more light scatters due to the increase of the particle diameters of the graft copolymer used as an impact strength modifier, the transparency of the PVC resin decreases. In addition, when a difference between a refractive index of the PVC resin particles and a refractive index of the graft copolymer particles is large or when a binding force between the MBS based graft copolymer and the PVC resin is weak during deformation and thus, micro-voids are easily formed, rather a degree of whitening may increase and the impact strength may decrease.

Much research has been conducted on an amount and a size of rubber particles, a graft polymerization method, and a graft composition, etc. to prepare graft copolymer particles having excellent impact resistance, transparency, and resistance to whitening. In particular, it is well known that when the use of rubber latex is limited according to its application, the amount of the monomers to be grafted and the graft polymerization method have a significant effect on the transparency and impact strength of a product.

In general, MBS based graft copolymers are typically used as additives to increase impact strength, resistance to whitening, processability, and optical properties of PVC resin. MBS based graft copolymers are generally prepared by grafting alkyl (meth)acrylate and an ethylenically unsaturated aromatic compound onto a rubber latex of a conjugated diene monomer-an ethylenically unsaturated aromatic compound such as styrene-butadiene rubber latex, using emulsion polymerization.

Factors having effects on the physical properties of MBS based graft copolymer include the amounts of the respective monomers to be grafted and the polymerization methods, and the most important factor is the physical property of a rubber latex used as a substrate of the MBS based graft copolymer. In particular, it is known that the size and amount of the rubber latex and a compositional ratio of monomers have direct effects on the optical and physical properties of the PVC resin.

U.S. Pat. No 4,352,910 by Katto et al. describes a method of preparing an MBS based graft copolymer well balanced between impact strength and resistance to whitening by controlling a glass transition temperature of a rubber latex using a multi-step polymerization.

However, improvement of color properties and low-temperature impact strength of PVC resins using MBS based graft copolymers is not described in conventional methods.

Thus, there is a need for a graft copolymer capable of improving color property and low-temperature impact strength of PVC resin and a method of preparing the graft copolymer.

BRIEF SUMMARY OF THE INVENTION

The present invention provides a rubber latex useful for preparing a graft copolymer which can modify an impact strength of a polyvinyl chloride (PVC) resin.

The present invention also provides a graft copolymer comprising the rubber latex.

The present invention also provides PVC resin blend comprising the graft copolymer.

The present invention also provides a method of preparing the rubber latex.

According to an aspect of the present invention, there is provided a rubber latex having a multi-layer structure, wherein an inner-layer rubber latex has a refractive index greater than that of an outer-layer rubber latex.

According to another aspect of the present invention, there is provided a graft copolymer prepared by performing graft emulsion polymerization of 5-50% by weight of at least one monomer selected from the group consisting of alkyl (meth) acrylate and an ethylenically unsaturated aromatic compound onto 50-95% by weight of the rubber latex.

According to still another aspect of the present invention, there is provided a PVC resin blend comprising 1-20% by weight of the graft copolymer and 80-99% by weight of a PVC resin.

According to yet another aspect of the present invention, there is provided a method of preparing the rubber latex, comprising: emulsion polymerizing 25-75% by weight of a monomer mixture of a conjugated diene monomer, an ethylenically unsaturated aromatic compound and a crosslinking agent to form an inner-layer rubber latex; and then emulsion polymerizing 25-75% by weight of the remaining monomer mixture to the inner-layer rubber latex to form an outer-layer rubber latex.

The PVC resin prepared using the graft copolymer as an impact strength modifier has a remarkably excellent impact strength, particularly low-temperature impact strength at −10° C. or less and an excellent color property.

The above aspects and advantages of the present invention will become more apparent by describing in detail exemplary embodiments thereof.

DETAILED DESCRIPTION OF THE INVENTION

Hereinafter, the present invention will be described in more detail.

First, a rubber latex, a graft copolymer prepared using the rubber latex, and a polyvinyl chloride (PVC) resin blend comprising the graft copolymer according to embodiments of the present invention will be explained as follows.

The present inventors found that in preparing a rubber latex useful as a substrate of an MBS based graft copolymer using multi-step polymerization, controls of refractive indexes of an inner-layer rubber latex and an outer-layer rubber latex may change the color property and low-temperature impact strength of the MBS based graft copolymer and a PVC blend comprising the graft copolymer, and completed the present invention.

A rubber latex used in preparing an MBS based graft copolymer according to an embodiment of the present invention has a multi-layer structure and is characterized in that an inner-layer rubber latex has a refractive index greater than that of an outer-layer rubber latex.

In an embodiment of the present invention, the rubber latex is a rubber latex of a copolymer of a conjugated diene monomer and an ethylenically unsaturated aromatic compound. The conjugated diene monomer may be at least one monomer selected from the group consisting of butadiene, isoprene, and chloroisoprene, but is not limited thereto. The ethylenically unsaturated aromatic compound may be at least one compound selected from the group consisting of styrene, alpha-methylstyrene, isopropenylnaphthalene, vinyinaphthalene, styrene having at least one of hydrogens on a benzene ring substituted with a $C_1$-$C_3$ alkyl group, and styrene having at least one of hydrogens on a benzene ring substituted with a halogen, but is not limited thereto.

In an embodiment of the present invention, the inner-layer rubber latex comprising the rubber latex may preferably have a refractive index of 1.54-1.59, more preferably 1.545-1.59. If the inner-layer rubber latex has a refractive index less than 1.54, impact strength is little improved. If the inner-layer rubber latex has a refractive index greater than 1.59, a degree of whitening may increase, and thus, transparency may decrease.

The outer-layer rubber latex comprising the rubber latex may preferably have a refractive index of 1.51-1.54, more preferably 1.51-1.535. If the outer-layer rubber latex has a refractive index less than 1.51, the transparency decreases. If the outer-layer rubber latex has a refractive index greater than 1.54, impact strength is little improved.

In an embodiment of the present invention, a graft copolymer prepared by emulsion polymerizing at least one monomer selected from the group consisting of alkyl (meth)acrylate and an ethylenically unsaturated aromatic compound with the rubber latex may be used as an impact strength modifier for PVC resins. The graft copolymer may be prepared by charging all the monomers into a reactor and emulsion polymerizing them in one step or by emulsion polymerizing the monomers in two or more steps. However, the emulsion polymerization method does not limit the present invention.

In preparing the graft copolymer according to an embodiment of the present invention, the rubber latex may be used in an amount of 50-95% by weight and the at least one monomer selected from the group consisting of alkyl (meth)acrylate and an ethylenically unsaturated aromatic compound may be used in an amount of 5-50% by weight. If the amount of the rubber latex is less than 50% by weight, impact strength is little improved. If the amount of the rubber latex is greater than 95% by weight, dispersibility decreases due to low compatibility of the rubber latex with the PVC resin, and as a result, impact strength does not efficiently increase.

The alkyl (meth)acrylate used in preparing the graft copolymer may be at least one compound selected from the group consisting of methyl methacrylate, ethyl methacrylate, methyl acrylate, and ethyl acrylate, but is not limited thereto.

The ethylenically unsaturated aromatic compound used in preparing the graft copolymer may be at least one compound selected from the group consisting of styrene, alpha-methylstyrene, isopropenylnaphthalene, vinylnaphthalene, styrene having at least one of hydrogens on a benzene ring substituted with a $C_1$-$C_3$ alkyl group, and styrene having at least one of hydrogens on a benzene ring substituted with a halogen, but is not limited thereto.

In an embodiment of the present invention, any conventional reaction mediums, emulsifiers, stabilizers, initiators, etc. known in the art may be used in emulsion polymerization of the rubber latex to prepare the graft copolymer. The present invention is not limited by them.

In an embodiment of the present invention, PVC resin blend may be prepared by blending the graft copolymer prepared using the rubber latex with PVC resin.

The PVC resin blend comprises 1-20% by weight of the graft copolymer according to an embodiment of the present invention and 80-99% by weight of a PVC resin. If the amount of the graft copolymer in the PVC resin blend is less than 1% by weight, impact strength is little improved. If the amount of the graft copolymer in the PVC resin blend is greater than 20% by weight, the impact strength does not further increase and production costs excessively increase.

In an embodiment of the present invention, the PVC resin is not specifically limited and may be any of those known in the art.

If necessary, the PVC resin blend may further comprise antioxidants, thermal stabilizers, plasticizers, colorants, and lubricants, etc. known in the art, in conventional amounts.

Hereinafter, a method of preparing the rubber latex according to an embodiment of the present invention will be explained.

The method of preparing the rubber latex comprises emulsion polymerizing 25-75% by weight of a monomer mixture of a conjugated diene monomer, an ethylenically unsaturated aromatic compound and a crosslinking agent to form an inner-layer (core-layer) rubber latex; and then emulsion polymerizing 25-75% by weight of the remaining monomer mixture to the core-layer rubber latex to form an outer-layer (shell-layer) rubber latex.

In the first emulsion polymerization to form the inner-layer rubber latex, 25-75% by weight of the monomer mixture of a conjugated diene monomer, an ethylenically unsaturated aromatic compound and a crosslinking agent may be used. If the amount of the monomers used in the first emulsion polymerization is less than 25% by weight, relative to a total weight of the monomer mixture, a low-temperature impact strength of the resultant PVC resin decreases. If the amount of the monomers used in the first emulsion polymerization is greater than 75% by weight, relative to a total weight of the monomer mixture, the color property of the PVC resin deteriorates and the low-temperature impact strength of the PVC resin decreases.

In the method according to an embodiment of the present invention, the conjugated diene monomer may be at least one monomer selected from the group consisting of butadiene, isoprene, and chloroisoprene. The conjugated diene monomer functions to absorb an impact from outside and to increase resistance to impact.

In the method according to an embodiment of the present invention, the ethylenically unsaturated aromatic compound may be at least one compound selected from the group consisting of styrene, alpha-methylstyrene, isopropenylnaphthalene, vinyinaphthalene, styrene having at least one of hydrogens on a benzene ring substituted with a $C_1$-$C_3$ alkyl group, and styrene having at least one of hydrogens on a benzene ring substituted with a halogen. The ethylenically unsaturated aromatic compound functions to make a refractive index of the rubber latex equal to a refractive index of the PVC resin, thereby preventing light scatter from occurring due to a difference between the refractive indexes. As a result, the transparency of the PVC resin may be maintained.

In an embodiment of the present invention, a crosslinking agent may be used in preparing the rubber latex. The crosslinking agent may be at least one compound selected from the group consisting of divinylbenzene, ethylene glycol dimethacrylate, diethylene glycol dimethacrylate, triethylene glycol dimethacrylate, 1,3-butylene glycol dimethacrylate, aryl methacrylate, and 1,3-butylene glycol diacrylate. The crosslinking agent functions to control a degree of crosslinking of the rubber latex.

In the method of preparing the rubber latex according to an embodiment of the present invention, the crosslinking agent may be used in an amount of 0.1-3% by weight, more preferably 0.1-1.5% by weight, relative to a total weight of the monomers. If the amount of the crosslinking agent is less than 0.1% by weight, resistance to whitening decreases. If the amount of the crosslinking agent is greater than 3% by weight, resistance to impact decreases.

The inner-layer rubber latex formed in the first emulsion polymerization may have a refractive index of 1.54-1.59. If the refractive index of the inner-layer rubber latex is less than 1.54, impact strength is little improved. If the refractive index of the inner-layer rubber latex is greater than 1.59, a degree of whitening may increase, and thus, transparency may decrease.

In the second emulsion polymerization to form the outer-layer rubber latex, 25-75% by weight of the remaining monomer mixture is emulsion polymerized with the inner-layer rubber latex prepared in the first emulsion polymerization.

The outer-layer rubber latex formed in the second emulsion polymerization may have a refractive index of 1.51-1.54. If the refractive index of the outer-layer rubber latex is less than 1.51, transparency decreases. If the refractive index of the outer-layer rubber latex is greater than 1.54, impact strength is little improved.

The conjugated diene monomer, the ethylenically unsaturated aromatic compound, and the crosslinking agent used in the method of preparing the rubber latex according to an embodiment of the present invention function to control the refractive index of the rubber latex and their amounts and types may be changed according to a desired physical property of the rubber latex. Thus, ratios of the amounts of the conjugated diene monomer, the ethylenically unsaturated aromatic compound, and the crosslinking agent are not limited in the present context. However, to ensure transparency by controlling the refractive indexes, the amount of the conjugated diene monomer: the amount of (the ethylenically unsaturated aromatic compound+the crosslinking agent) may be in a ratio of 3:1 in both the first emulsion polymerization and the second emulsion polymerization.

25-75% by weight of the monomers may be used relative to a total weight of the monomer mixture in the first emulsion polymerization and 25-75% by weight of the remaining monomer mixture may be used in the second emulsion polymerization. In this case, the inner-layer rubber latex formed in the first emulsion polymerization may have a refractive index of 1.54-1.59 and the outer-layer rubber latex formed in the second emulsion polymerization may have a refractive index of 1.51-1.54.

In the method according to an embodiment of the present invention, any conventional reaction mediums, emulsifiers, stabilizers, initiators, etc. known in the art may be used, without limitation, in emulsion polymerization in conventional amounts. They will be described with reference to the following examples.

When the graft copolymer prepared using the rubber latex according to an embodiment of the present invention is used as an impact strength modifier for PVC resin, the color property of the PVC resin has a 'b' value of 10 or less, as measured using a colorimeter according to ASTM 1003. Further, a low-temperature impact strength of the PVC resin is at least 300 rpm at −20° C., as measured using an estimation method described below. That is, the PVC resin according to an embodiment of the present invention has more excellent color property and impact strength, particularly low-temperature impact strength than a conventional PVC resin.

Hereinafter, the present invention will be described in more detail with reference to the following examples. However, these examples are given for the purpose of illustration and are not intended to limit the scope of the invention. Modification and variation, etc. of the present invention with maintaining its basic concept are understood as being included in the scope of the present invention.

EXAMPLES

Example 1

(Preparation of a Rubber Latex)

The percentages by weight of the following compounds are based on 100% by weight of a mixture of monomers used to prepare a rubber latex, and parts by weight are based on 100 parts by weight of the monomer mixture.

First, 150 parts by weight of deionized water, 0.5 parts by weight of a buffer solution, 1.0 parts by weight of potassium oleate, 0.0047 parts by weight of ethylene diamine tetrasodium acetate, 0.003 parts by weight of ferrous sulfate, 0.02 parts by weight of sodium formaldehyde sulfoxylate and 0.1 parts by weight of diisopropylbenzene hydroperoxide were charged into a 120-liter high pressure polymerization vessel equipped with a stirrer.

In the first step, 30% by weight of butadiene, 19.5% by weight of styrene and 0.5% by weight of divinylbenzene were charged into the vessel and the polymerization was performed at 35° C. In the second step, at a polymerization conversion of the charged monomers of 90% or more, 45% by weight of butadiene, 4.5% by weight of styrene, 0.5% by weight of divinylbenzene and 0.5 parts by weight of potassium oleate were added to the vessel. Then, the polymerization was performed for 10 hours to obtain a styrene-butadiene rubber latex having a particle size of 1000 Å. The final polymerization conversion of the latex was 98%.

(Preparation of an MBS Based Graft Copolymer)

The percentages by weight of the following compounds are based on 100% by weight of the above rubber latex and a freshly added mixture of monomers used to prepare an MBS based graft copolymer, and parts by weight are based on 100 parts by weight of the above rubber latex and the freshly added mixture of monomers.

70% by weight (solid content) of the obtained rubber latex was charged into a sealed reactor and then, the reactor was filled with nitrogen. 0.0094 parts by weight of ethylene diamine tetrasodium acetate, 0.006 parts by weight of ferrous sulphate, and 0.04 parts by weight of sodium formaldehyde sulfoxylate were charged into the reactor. Subsequently, 14% by weight of methyl methacrylate, 0.14 parts by weight of potassium oleate, 14 parts by weight of deionized water, and 0.05 parts by weight of t-butyl hydroperoxide were added to the reactor and the polymerization was performed at 60° C. for 2 hours. Then, 16% by weight of styrene, 0.0094 parts by weight of ethylene diamine tetrasodium acetate, 0.006 parts by weight of ferrous sulphate, 0.04 parts by weight of sodium formaldehyde sulfoxylate, 0.16 parts by weight of potassium oleate, 16 parts by weight of deionized water and 0.05 parts by weight of t-butyl hydroperoxide were charged into the reactor and the polymerization was performed at 60° C. for 2 hours.
(Preparation of MBS Powders)

0.5 parts by weight of an antioxidant (Irganox-245) was added to 100 parts by weight of the obtained reaction product, methyl methacrylate-butadiene-styrene graft copolymer (MBS graft copolymer)(liquid) and, while stirring, 4 parts by weight of magnesium sulfate and 2 parts by weight of sulfuric acid were added thereto to separate the polymer from water at 70° C. Then, the resultant product was dehydrated and dried to obtain MBS powders.
(Preparation of a Specimen of PVC Resin)

A specimen of PVC resin was prepared using a master batch of PVC resin in order to facilitate its processing. The master batch of the PVC resin was prepared by uniformly mixing 100 parts by weight of PVC resin, 1.5 parts by weight of a thermal stabilizer (Sn stearate), 1.0 parts by weight of an internal lubricant (calcium strearate), 0.5 parts by weight of an external lubricant (paraffin wax), 0.5 parts by weight of a processing aid (PA-910, available from LG Chem, Ltd.) and 0.3 parts by weight of a pigment using a high-speed stirrer at 130° C. and cooling the resultant mixture.

An amount of an impact strength modifier used to prepare a PVC resin specimen was 9 parts by weight based on 100 parts by weight of the PVC resin. The resultant product was rolled using a roll at 195° C. to obtain a sheet having a thickness of 0.5 mm, which was used to measure a low-temperature rotation impact strength.

Example 2

The procedure was performed in the same manner as in Example 1, except that 25% by weight of butadiene, 24% by weight of styrene, and 1% by weight of divinylbenzene were used in the first step of the rubber latex polymerization, and 50% by weight of butadiene was used in the second step of the rubber latex polymerization.

Comparative Example 1

The procedure was performed in the same manner as in Example 1, except that 37.5% by weight of butadiene, 12% by weight of styrene, and 0.5% by weight of divinylbenzene were used in the first step of the rubber latex polymerization, and 37.5% by weight of butadiene, 12% by weight of styrene, and 0.5% by weight of divinylbenzene were used in the second step of the rubber latex polymerization.

Comparative Example 2

The procedure was performed in the same manner as in Example 1, except that 45% by weight of butadiene, 4.5% by weight of styrene, and 0.5% by weight of divinylbenzene were used in the first step of the rubber latex polymerization, and 30% by weight of butadiene, 19.5% by weight of styrene, and 0.5% by weight of divinylbenzene were used in the second step of the rubber latex polymerization.

Comparative Example 3

The procedure was performed in the same manner as in Example 1, except that 50% by weight of butadiene was used in the first step of the rubber latex polymerization, and 25% by weight of butadiene, 24% by weight of styrene, and 1% by weight of divinylbenzene were used in the second step of the rubber latex polymerization.

Comparative Example 4

The procedure was performed in the same manner as in Example 1, except that in the polymerization of the rubber latex, 75% by weight of butadiene, 24% by weight of styrene, and 1% by weight of divinylbenzene were charged together into the vessel and the polymerization was performed in one step.
(Experiments of Physical Properties)
Estimation of Refractive Index A latex prepared in each of the steps of the rubber latex polymerization in Examples 1-2 and Comparative Examples 1-4 was dried by heating it at 70° C. to obtain a film. A refractive index of the obtained film was measured using a refractometer (Refractometer, available from Abbe) at 25° C.

Estimation of Glass Transition Temperature ($T_g$)

A glass transition temperature was measured using DMTA V (available from Rheometric Scientific, Inc.) with elevating the temperature of the rubber latex prepared in each of the steps described above from room temperature at a heating rate of 10° C.//min.

Estimation of Low-Temperature Impact Strength

The low-temperature impact strength was measured as follows. Each of the sheets prepared in Examples 1-2 and Comparative Examples 1-4 was cut to a specimen having a dimension of 0.5 mm (thickness)×10 cm×14 cm, and then the specimen was aged at −20° C. for 2 hours. The minimum rpm at which the specimen was broken when the specimen moved at a speed of 15 mm/sec toward a rotating round saw was measured to obtain its low-temperature impact strength.

Estimation of Color Property

Each of the sheets prepared in Examples 1-2 and Comparative Examples 1-4 was pressed using a heat press to prepare a specimen having a thickness of 3 mm for measuring a color property according to ASTM 1003. Then, 'b' value was measured for each specimen using a color computer (SUGA Color Computer).

The refractive index and the glass transition temperature of the rubber latex obtained in each of the steps of the rubber latex polymerization in Examples 1-2 and Comparative Examples 1-4 and the color property and the low-temperature impact strength of each of the PVC resin blends obtained in Example 1-2 and Comparative Examples 1-4 were shown in Table 1.

TABLE 1

| | Composition of monomers in each step of the latex polymerization | | Refractive index: The first step/ the second step | $T_g$: The first step/the second step (° C./° C.) | Color property (b value) | Low-temperature impact strength |
|---|---|---|---|---|---|---|
| | The first step | The second step | | | | |
| Example 1 | BD 30 SM 19.5 DVB 0.5 | BD 45 SM 4.5 DVB 0.5 | 1.5466/1.5244 | −43/−76 | 7.81 | 440 rpm |
| Example 2 | BD 25 SM 24 DVB 1 | BD 50 | 1.5540/1.5170 | −27/−84 | 7.00 | 480 rpm |
| Comparative Example 1 | BD 37.5 SM 12 DVB 0.5 | BD 37.5 SM 12 DVB 0.5 | 1.5355/1.5355 | −63/−60 | 10.96 | 280 rpm |
| Comparative Example 2 | BD 45 SM 4.5 DVB 0.5 | BD 30 SM 19.5 DVB 0.5 | 1.5244/1.5466 | −80/−41 | 11.89 | 200 rpm |
| Comparative Example 3 | BD 50 | BD 25 SM 24 DVB 1 | 1.5170/1.5540 | −90/−25 | 12.20 | 180 rpm |
| Comparative Example 4 | | BD 75 SM 24 DVB 1 | 1.5355 | −63 | 10.68 | 250 rpm |

In Table 1, BD refers to butadiene, SM refers to styrene, and DVB refers to divinylbenzene.

It was confirmed from Table 1 that the color property and low-temperature impact strength of the PVC resins obtained using the MBS based graft copolymers as an impact strength modifier were improved, the MBS based graft copolymers being obtained using the rubber latexes prepared by changing a refractive index in each step using a multi-step polymerization according to the present invention. That is, when a refractive index of the internal-layer rubber latex was 1.54-1.59 and a refractive index of the external-layer rubber latex was 1.51-1.54 as in Examples 1 and 2, the color properties of the PVC resins were improved and the low-temperature impact strengths of the PVC resins increased; while when refractive indexes of the internal-layer and the external-layer rubber latexes deviated from the above ranges as in Comparative Examples 1-4, the color properties of the PVC resins were deteriorated and the low-temperature impact strengths of the PVC resins decreased. In particular, when all the monomers were charged into a reactor and polymerized in one step in Example 4, both the color property and the low-temperature impact strength of the PVC resin were deteriorated compared to those of the PVC resins obtained in Examples 1-2 according to the present invention.

Thus, it was confirmed that when the MBS based graft copolymer obtained using the rubber latex having different refractive indexes in each step according to the present invention, as a substrate, was used in preparing a PVC resin, the resultant PVC resin had excellent color property and low-temperature impact strength.

As explained in the above Examples 1-2 and Comparative Examples 1-4, when the MBS based graft copolymer obtained using a method according to the present invention is used as an impact strength modifier for a PVC resin, the resultant PVC resin has excellent color property and low-temperature impact strength.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rubber latex formed from a copolymer of a conjugated diene, an ethylenically unsaturated aromatic compound and optionally, a crosslinking agent, said crosslinking agent being selected from the group consisting of divinylbenzene, ethylene glycol dimethacrylate, diethylene glycol dimethacrylate, triethylene glycol dimethacrylate, 1,3-butylene glycol dimethacrylate, aryl methacrylate, and 1,3-butylene glycol diacrylate, wherein the rubber latex has a multi-layer structure with an inner-layer rubber latex having a refractive index of 1.54-1.59 and an outer-layer rubber latex having a refractive index of 1.51-1.54, and wherein the monomeric ratio averaged over the entirety of said rubber latex is about conjugated diene : (ethylenically unsaturated aromatic compound + crosslinking agent) =3:1 by weight, wherein a difference between the refractive index of the inner-layer rubber latex and that of the outer-layer rubber latex is greater than or equal to 0.0222.

2. The rubber latex of claim 1, wherein the conjugated diene monomer is at least one monomer selected from the group consisting of butadiene, isoprene, and chloroisoprene.

3. The rubber latex of claim 1, wherein the ethylenically unsaturated aromatic compound is at least one compound selected from the group consisting of styrene, alpha-methylstyrene, isopropenylnaphthalene, vinylnaphthalene, styrene having at least one of hydrogens on a benzene ring substituted with a $C_1$-$C_3$ alkyl group, and styrene having at least one of hydrogens on a benzene ring substituted with a halogen.

4. A graft copolymer prepared by performing graft emulsion polymerization of 5-50% by weight of at least one monomer selected from the group consisting of alkyl (meth)acrylate and an ethylenically unsaturated aromatic compound onto 50-95% by weight of a rubber latex having a multi-layer structure, said weight percentages being based on the weight of the ungrafted rubber latex, wherein an inner-layer rubber latex has a refractive index greater than that of an outer-layer rubber latex, and wherein:

(a) the rubber latex is a copolymer of a conjugated diene monomer, an ethylenically unsaturated aromatic compound, and optionally a crosslinking agent, said crosslinking agent being selected from the group consisting of divinylbenzene, ethylene glycol dimethacrylate, diethylene glycol dimethacrylate, triethylene glycol dimethacrylate, 1,3-butylene glycol dimethacrylate, aryl methacrylate, and 1,3-butylene glycol diacrylate;

(b) the rubber latex is a conjugated diene monomer with at least one monomer selected from the group consisting of butadiene, isoprene, and chloroisoprene, (c) the ethylenically unsaturated aromatic compound of the rubber latex is at least one compound selected from the group consisting of styrene, alpha-methylstyrene, isopropenylnaphthalene, vinylnaphthalene, styrene having at least one of hydrogens on a benzene ring substituted with a $C_1$-$C_3$ alkyl group, and styrene having at least one of hydrogens on a benzene ring substituted with a halogen;

(d) the inner-layer rubber latex has a refractive index of 1.54-1.59 and the outer-layer rubber latex has a refractive index of 1.51-1.54; and (e) the relative monomeric ratio averaged over the entirety of said rubber latex is about conjugated diene : (ethylenically unsaturated aromatic compound + crosslinking agent) =3:1 by weight, (f) a difference between the refractive index of the inner-layer rubber latex and that of the outer-layer rubber latex is greater than or equal to 0.0222.

5. The graft copolymer of claim 4, wherein the alkyl (meth) acrylate is at least one compound selected from the group consisting of methyl methacrylate, ethyl methacrylate, methyl acrylate, and ethyl acrylate.

6. The graft copolymer of claim 4, wherein the ethylenically unsaturated aromatic compound polymerized onto 50-95% by weight of the rubber latex is at least one compound selected from the group consisting of styrene, alpha-methylstyrene, isopropenylnaphthalene, vinylnaphthalene, styrene having at least one of hydrogens on a benzene ring substituted with a $C_1$-$C_3$ alkyl group, and styrene having at least one of hydrogens on a benzene ring substituted with a halogen.

7. A polyvinyl chloride (PVC) resin blend comprising 1-20% by weight of the graft copolymer of any one of claims 4-6 and 80-99% by weight of a PVC resin.

8. A method of preparing a rubber latex, comprising:
emulsion polymerizing 25-75% by weight of a monomer mixture of a conjugated diene monomer, an ethylenically unsaturated aromatic compound and a crosslinking agent to form an inner-layer rubber latex; and then emulsion polymerizing 25-75% by weight of the remaining monomer mixture to the inner-layer rubber latex to form an outer-layer rubber latex, wherein the inner-layer rubber latex has a refractive index of 1.54-1.59 and the outer-layer rubber latex has a refractive index of 1.51-1.54 and the relative monomeric ratio combined over the two emulsion polymerization stages is about conjugated diene : (ethylenically unsaturated aromatic compound + crosslinking agent) =3:1 by weight wherein a difference between the refractive index of the inner-layer rubber latex and that of the outer-layer rubber latex is greater than or equal to 0.0222.

9. The method of claim 8, wherein the conjugated diene monomer is at least one monomer selected from the group consisting of butadiene, isoprene, and chloroisoprene.

10. The method of claim 8, wherein the ethylenically unsaturated aromatic compound is at least one compound selected from the group consisting of styrene, alpha-methylstyrene, isopropenylnaphthalene, vinylnaphthalene, styrene having at least one of hydrogens on a benzene ring substituted with a $C_1$-$C_3$ alkyl group, and styrene having at least one of hydrogens on a benzene ring substituted with a halogen.

11. The method of claim 8, wherein the crosslinking agent is at least one compound selected from the group consisting of divinylbenzene, ethylene glycol dimethacrylate, diethylene glycol dimethacrylate, tri ethylene glycol dimethacrylate, 1,3-butylene glycol dimethacrylate, aryl methacrylate, and 1,3-butylene glycol diacrylate.

12. The method of claim 8, wherein the crosslinking agent is used in an amount of 0.1-3% by weight, relative to a total weight of the monomers.

* * * * *